United States Patent
Graetz et al.

[11] Patent Number: 6,077,064
[45] Date of Patent: Jun. 20, 2000

[54] INJECTION MOLDING APPARATUS AND METHOD FOR MOUNTING SAME

[75] Inventors: Josef Graetz, Erin; John Galt, Nobelton, both of Canada

[73] Assignee: Husky Injection Molding Systems Ltd., Canada

[21] Appl. No.: 09/162,862

[22] Filed: Sep. 29, 1998

[51] Int. Cl.[7] .................... B29C 45/00; B29C 45/03
[52] U.S. Cl. .............. 425/192 R; 425/88; 425/542; 264/328.1
[58] Field of Search ................ 425/190, 192 R, 425/542, DIG. 200, 88; 264/328.1

[56] References Cited

U.S. PATENT DOCUMENTS

| | | | |
|---|---|---|---|
| 2,844,846 | 7/1958 | Kronholm | 425/72.1 |
| 3,981,655 | 9/1976 | Horbach | 425/181 |
| 5,570,805 | 11/1996 | Harding | 220/565 |
| 5,707,667 | 1/1998 | Galt et al. | 425/589 |

OTHER PUBLICATIONS

Evidence A: Galt et al., Patent No. 5,707,667, Sound Insulated Injection Molding Machine, Jan. 13, 1998.

*Primary Examiner*—Harold Pyon
*Assistant Examiner*—Emmanuel Luk
*Attorney, Agent, or Firm*—Bachman & LaPointe, P.C.

[57] ABSTRACT

Apparatus includes an injection molding unit and a power source for the unit including at least one hydraulic pump and an electric motor for driving said pump. A concrete mounting base is provided and a steel mounting plate affixed to the concrete mounting plate mounting the power source, with the steel mounting plate including a mounting structure therein mounting said power source. A method is also provided for mounting an injection molding apparatus.

22 Claims, 5 Drawing Sheets

INJECTION MOLDING APPARATUS AND METHOD FOR MOUNTING SAME

BACKGROUND OF THE INVENTION

The present invention relates to an improved injection molding apparatus including power units therefor, and more particularly an injection molding apparatus having reduced noise emissions and reduced vibration transmission, plus an improved method for reducing noise emission and vibration transmission in an injection molding apparatus.

U.S. Pat. No. 5,707,667 by Galt, Kestle and Yetter teaches an improved sound insulated injection molding machine including at least one hydraulic pump and an electric motor means for powering said pump. It is desirable to provide further improvements in the reduction of noise emission and vibration transmission.

Injection molding machines that use hydraulics as a primary source of power transfer are all faced with the problem of noise and vibration generated by the hydraulic system. The problem manifests itself in three ways: fluid borne noise; structural or mechanical borne noise; and air borne noise. All three of these may be addressed in various ways, which include both mechanical and hydraulic modifications. However, reduction in noise emission and vibration transmission represents a long sought after goal.

The hydraulic power source in an injection molding system is one or more hydraulic pumps driven by an electric motor. The pumps are structurally connected to the electric motor, as with an adapter flange, with the rotational drive being provided by a rotary coupling. The electric motor and hydraulic pump assembly are supported on vibration dampening pads, which are in turn fastened to the injection molding machine base.

A characteristic of hydraulic pumps is that they have a high power density. This means that the electrical power of the electric motor is converted to hydraulic power in a small package. Part of this energy conversion requires that low pressure hydraulic fluid is brought up to a high level of pressure in a very short time. This quick rise of pressure is accomplished on many small volumes of oil within the pump in short succession. This in turn creates high frequency pressure pulses in both the high pressure outlet of the pump and the low pressure inlet of the pump. The housing of the pump also vibrates due to these pulses.

The pressure pulses in the suction and pressure lines of the pump create not only fluid borne noise but mechanical vibrations in the suction and pressure lines. These vibrations are transmitted to the machine reservoir and base, and also to the structure that supports the pump and motor assembly, which is normally part of the machine base and which will be referred to herein as a "drip pan".

The machine reservoir, base and drip pan are usually fabricated of the same material. For most applications this material is steel, which can be of welded, formed or cast construction. The disadvantage of using the same material throughout the base structure is that it will then inherently have the same natural frequency. It is desirable to reduce vibration transmission in these structures by designing the structures with suitable materials of different natural frequencies since this will make the transmission of vibration energy less efficient.

The structural transmission of vibration energy may also be reduced by adding damping elements and masses in series between the vibration energy source and the vibration energy dissipater, i.e., the side of the reservoir which converts some of the structural vibration energy to air borne vibration energy or sound. The larger the masses are in this system, the less efficient the energy transfer becomes.

Hot and cold rolled steel is also highly reflective to air borne sound energy. In efforts of noise reduction in the area of the hydraulic pumps, the majority of the air borne noise will simply reflect off any of the structure fabricated from steel. This would include the drip pan area under the pumps as well as the side of the reservoir and base. It would be desirable to utilize a suitable material that has the ability to absorb sound energy rather than one that reflects sound energy.

Accordingly, it is a principal object of the present invention to provide an improved injection molding apparatus which includes a power source and which has reduced noise emission and vibration transmission characteristics, as well as an improved method for mounting power components to an injection molding apparatus.

It is a further object of the present invention to provide an improved apparatus and method as aforesaid which is simple, convenient, inexpensive and effective.

Further objects and advantages of the present invention will appear hereinbelow.

SUMMARY OF THE INVENTION

In accordance with the present invention, the foregoing objects and advantages are readily obtained.

The injection molding apparatus of the present invention comprises: an injection molding unit; a power source for said injection molding unit including at least one hydraulic pump and at least one electric motor driving said pump; a concrete mounting base with a mounting plate affixed thereto, preferably steel, said concrete mounting base and mounting plate mounting said power source, with mounting means in the mounting plate for mounting said motor and pump.

The present invention also includes a method for mounting an injection molding apparatus, which comprises: providing an injection molding unit including a power source for said injection molding unit, said power source including at least one hydraulic pump and at least one electric motor for driving said pump; and mounting said power source on a concrete mounting base with a metal, preferably steel, mounting plate affixed to said concrete mounting base and with mounting means in the metal mounting plate mounting said pump and motor.

Further features and advantages of the present invention will appear hereinbelow.

BRIEF DESCRIPTION OF THE DRAWINGS

The present invention will be more readily understandable from a consideration of the accompanying exemplificative drawings, wherein.

DETAILED DESCRIPTION OF PREFERRED EMBODIMENTS

In accordance with the present invention, an improved apparatus and method is provided for reducing machine noise and vibration. The present invention effectively uses a drip pan made of a material that has a different natural frequency than steel and which has an ability to absorb sound energy while at the same time providing effective support for the power source for the injection molding unit.

The present invention uses a drip pan made of concrete. Concrete has a different natural frequency than steel, yet it is quite dense and is porous enough to absorb sound energy.

In addition to the foregoing, the present invention affixes a metal plate, preferably steel, to the concrete mounting base, with mounting means as mounting holes, in the metal plate for mounting the power source to the concrete base and metal plate. A reinforcing member, as a steel or other metal bar, is also desirably affixed to the concrete base to provide additional strengthening to the concrete base. In addition, a recessed portion is provided in the concrete base, generally under the pumps, to provide a site to catch spilled fluids as oil, and a removable plug in the concrete base covering a channel communicating with the recess to provide a means to access to the recess to drain fluid spilled into the recess. Further, desirably a mounting strut is also provided affixed to the concrete mounting base to provide a further site for mounting components of the power source, as for example to mount the hydraulic pumps.

It has been found that the foregoing structure effectively reduces noise emission and vibration transmission in an injection molding apparatus by mounting the pump and motor assembly, i.e., the drip pan, thereon. The features of the present invention in a drip pan are particularly advantageous in an injection molding machine in view of the high frequency and high level of energy vibration, the number of machine cycles and the different types of fluids which may come into contact with the drip pan material.

Figure 1:
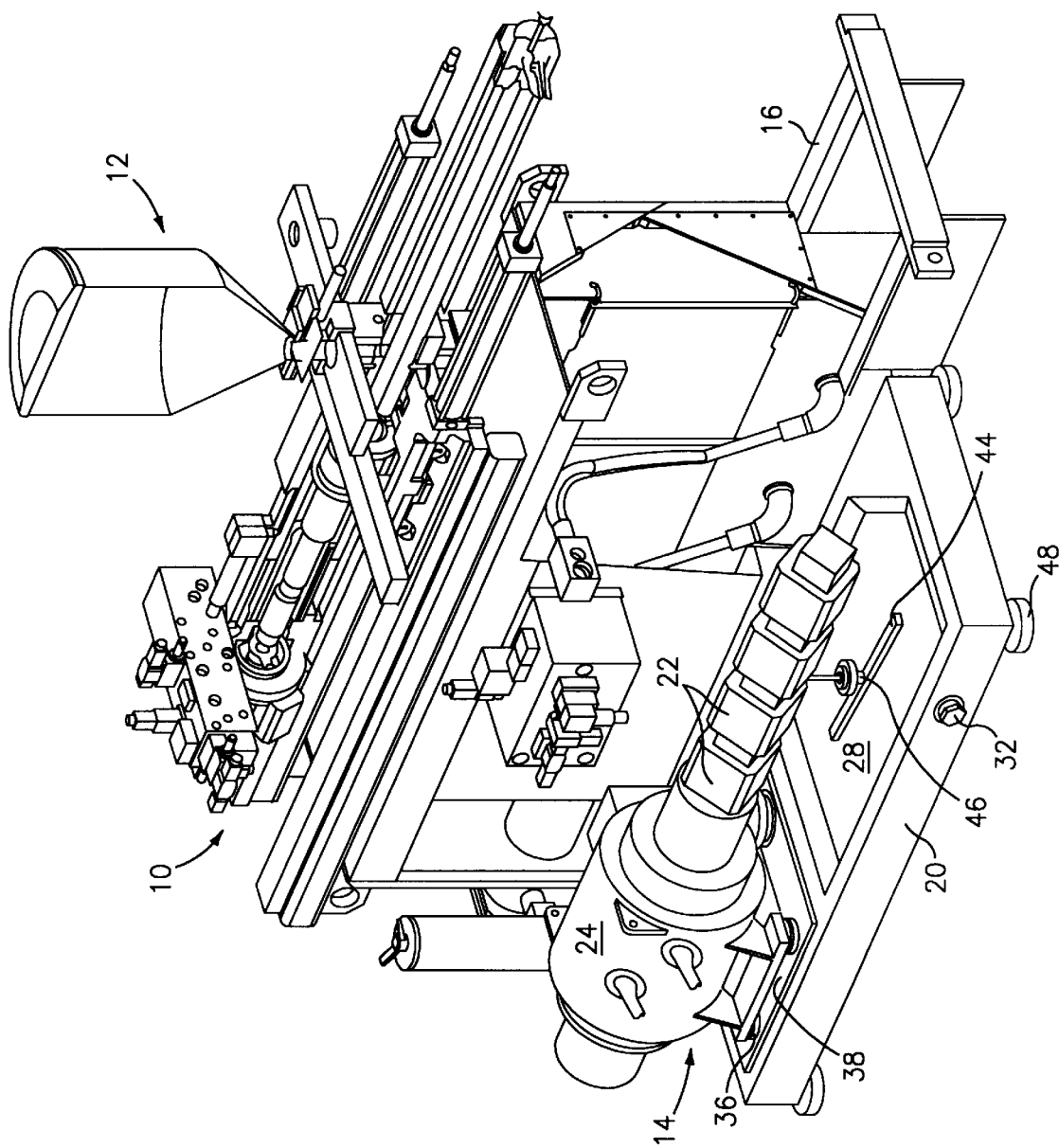
FIG. 1 shows a perspective view of the injection molding apparatus of the present invention.
Figure 2:
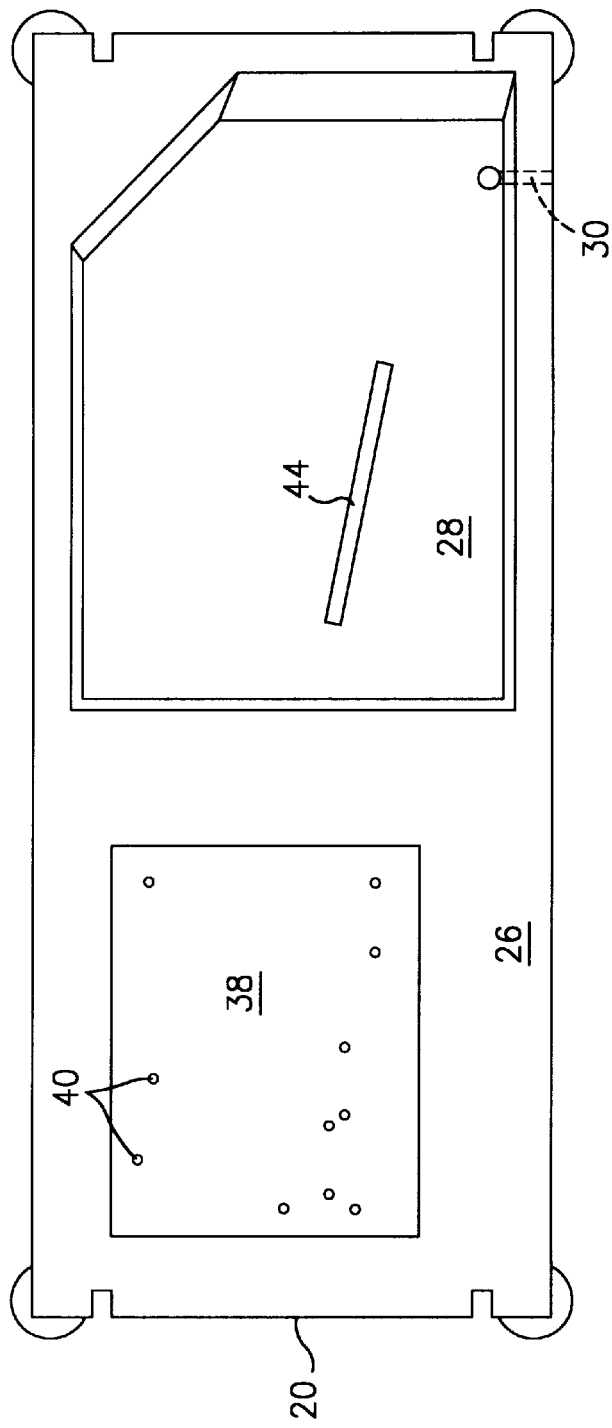
FIG. 2 shows a top view of the concrete mounting plate of the present invention with metal mounting plate affixed thereto.
Figure 3:
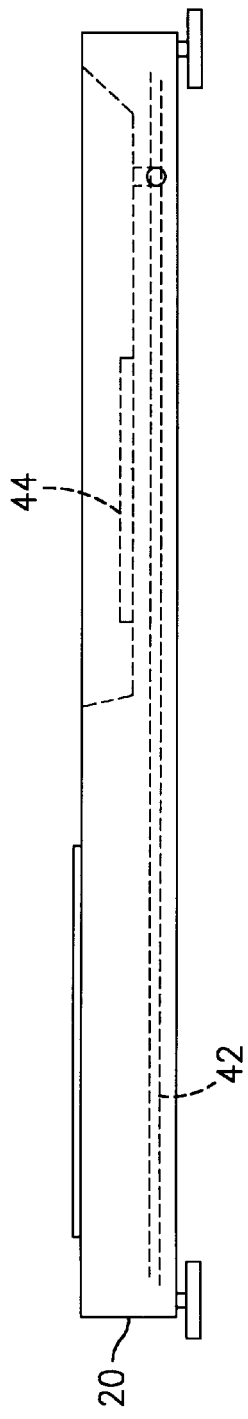
FIG. 3 shows a side view of the mounting plate of FIG. 3.
Figure 4:
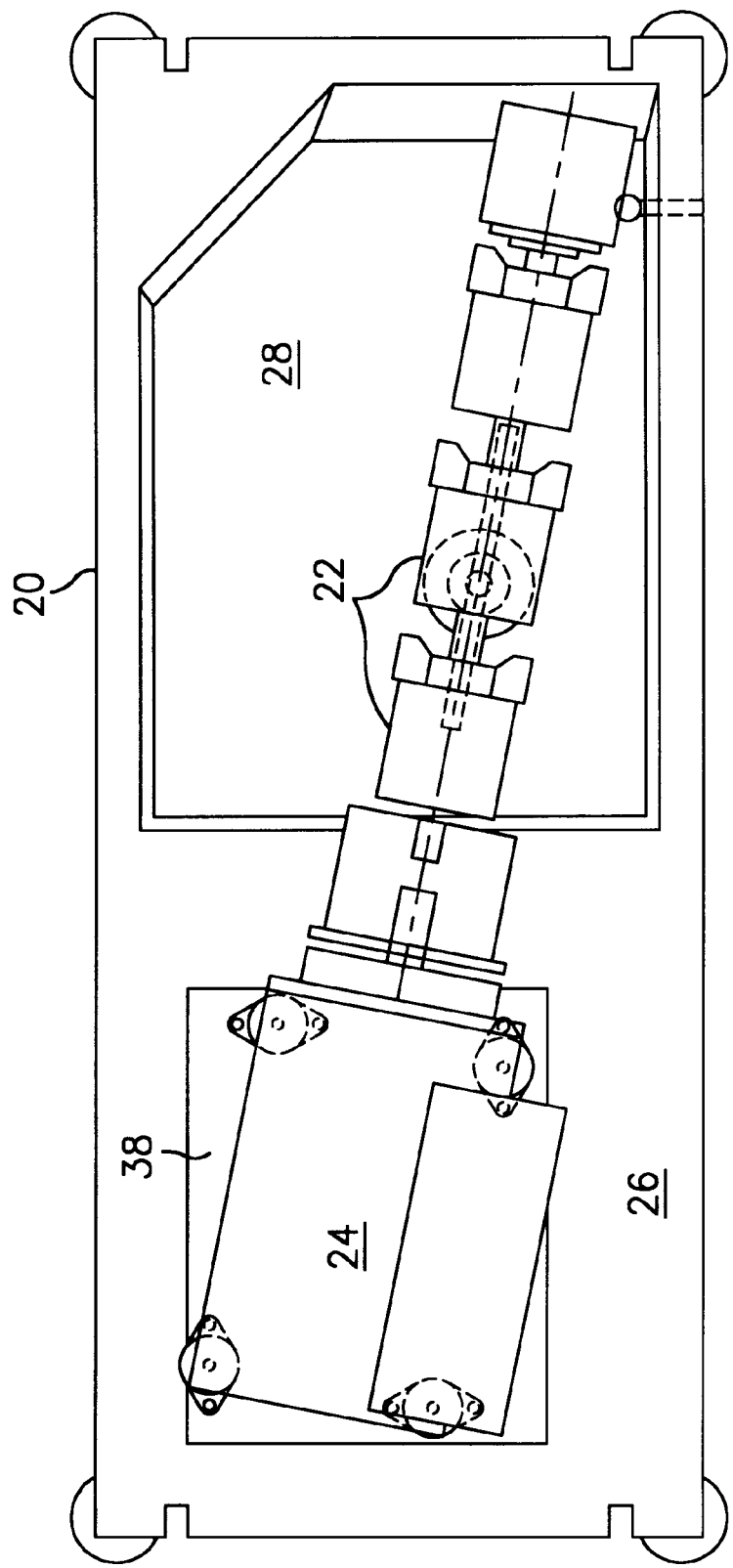
FIG. 4 is a top view of the mounting plate of FIG. 2 with the power source mounted thereon.
Figure 5:
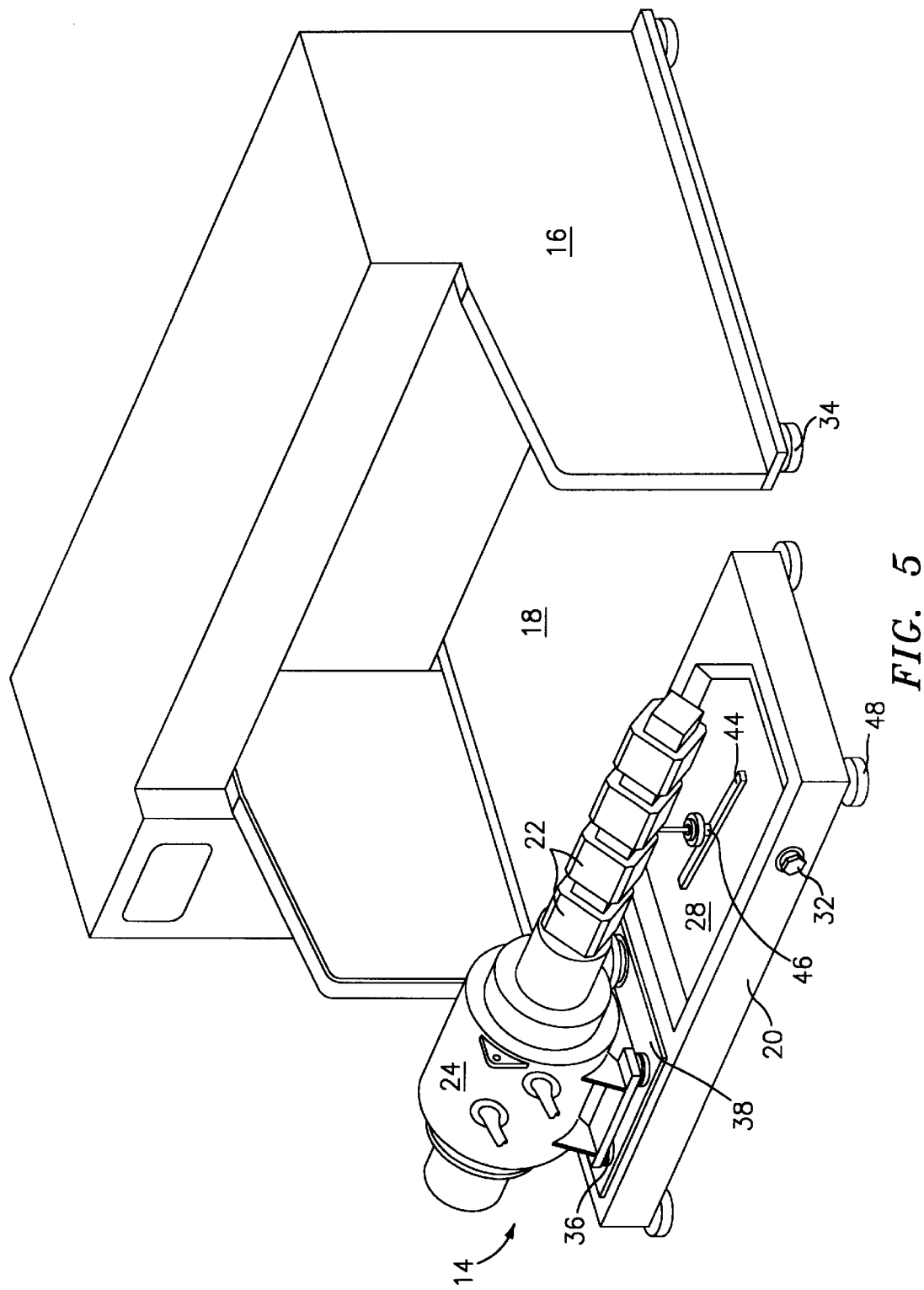
FIGS. 5–6 are perspective views of additional embodiments of the present invention.
Figure 6:
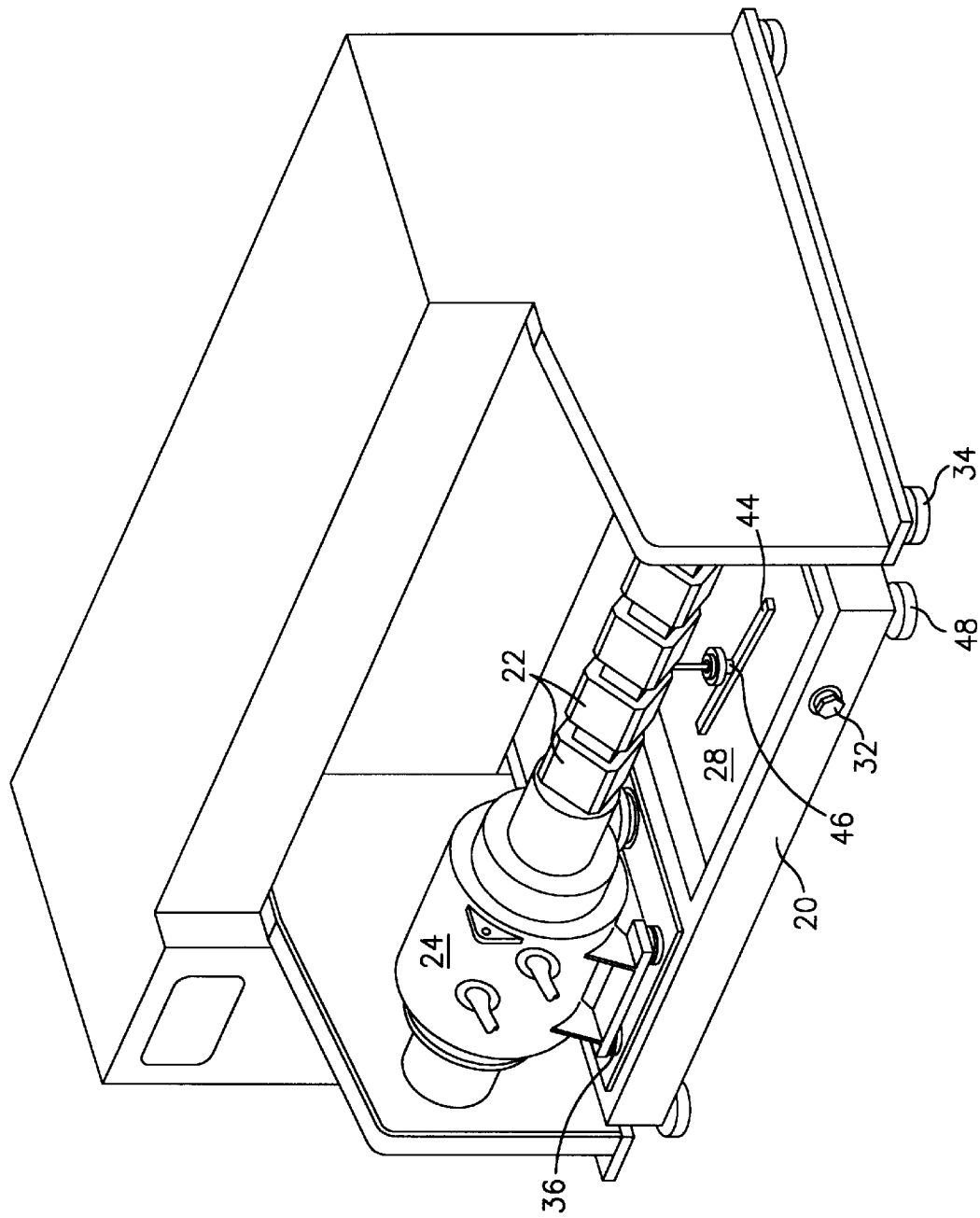

FIG. 1 shows injection molding apparatus 10 of the present invention including an injection molding unit 12 and a power source 14 for said unit 12. FIG. 1 shows the power source spaced from the injection molding unit and FIGS. 5–6 show the power source which can be slid into an injection base recess, as will be described below. For convenience, the injection molding unit is not shown in FIGS. 5–6. The injection molding unit 12 is mounted on injection molding unit base 16 and desirably includes recess 18 therein as shown in FIGS. 5–6. Power source 14 is mounted on concrete mounting base 20 in a manner to be described below which can be slid into the injection base recess 18 as clearly shown in FIG. 6 or withdrawn therefrom a sufficient distance to provide all around access thereto for servicing, as with a fork lift. Obviously, electrical wiring and hydraulic hosing connections will have sufficient length to allow the concrete base to be withdrawn a sufficient distance to allow complete access to the power source. Thus, in the embodiments of FIGS. 5–6, the power source 14 is substantially enclosed within the molding unit base 16.

Thus, in the preferred embodiment of FIGS. 5–6, concrete mounting base 20 is located under the injection unit. The power source 14 includes at least one hydraulic pump 22, with more than one such pumps shown in the drawings, and at least one motor 24 driving the pump or pumps, desirably an electric motor.

As clearly shown in FIGS. 1–6, concrete mounting base 20 is desirably a rectangular structure, although any convenient shape may be employed, with a raised platform 26 for mounting motor 24 and a recess 28 for mounting the pump or pumps 22 and to catch any spilled fluids, as hydraulic oil. A channel or channels 30 is desirably formed in the concrete mounting base communicating with recess 28 with a removable plug 32 thereon to provide a means to remove spilled fluids from the recess. The power source 14 is connected to the injection molding unit 12 by conventional means which will not be described in more detail. Similarly, the injection molding unit includes conventional components, as clamps, molds, manifolds, platens, injection nozzles and the like which also will not be described in detail herein.

Base 16 of injection molding unit 12 is desirably mounted on mounting pads 34 which may be of any convenient structure, as for example rubber coated metal with the base affixed to the pad and the pad affixed to the floor or to a support plate, as by screwing the base into the pad and screwing the pad into the floor or support plate. Similarly, motor 24 is desirably mounted on mounting pads 36 which also may be of any convenient structure, as similar to pads 34, with the motor affixed to the pad and the pad affixed to a metal mounting plate 38 affixed to the raised platform 26 of concrete mounting base 20 as by mounting holes 40 in the metal mounting plate. The metal mounting plate is desirably of steel, although any convenient and suitable material may be used, as for example, high strength plastic or other metals. The mounting plate 38 is desirably embedded in the platform 26 of concrete mounting base 20.

At least one reinforcing member 42 is desirably embedded in the concrete mounting base 20 to provide additional strengthening thereto, as for example one or more metal bars or a metal mesh or grid, desirably steel.

A guide member 44 is desirably affixed to the recess 28 of concrete mounting base 20 to support pumps 22 as by at least one strut 46 which is movable in the guide member 44 to allow for expansion during operation.

In addition to the foregoing, the concrete mounting base 20 desirably includes mounting pads 48 which also may be of any convenient structure, as similar to pads 34. Alternatively, the concrete mounting base 20 may rest on mounting provisions located on machine base 16. The mounting pads 34, 36 and 48 are desirably located where pressure is expected to be exerted.

Naturally, there are appropriate hydraulic hose fittings and electrical wiring connections between the power source and injection unit, but these are conventional and will not be described in more detail herein.

Thus, in accordance with the present invention, the concrete drip tray is desirably located under the machine base and rests on vibration reducing pads. The motor and pumps are mounted on the drip tray and also rest on vibration reducing pads.

The drip tray is configured in such a manner that a recess area is provided under the pumps surrounded by a perimeter wall of the concrete base of sufficient height to catch a large volume of spilled oil. The draining of the spilled oil from the recess may be conveniently accomplished by removing a plug in the wall of the base. A plug retaining fixture may be cast into the wall of the concrete base.

The mounting of the electric motor and pumps to the concrete mounting base requires relatively high precision of dimension tolerances of one mount relative to the other. This is accomplished by affixing a pre-machined plate to the concrete base, as a steel mounting plate cast into the concrete base, which provides all the necessary mounting holes.

The concrete mounting base or tray is designed in such a way that it is an integral part of the power pack of the injection molding apparatus. This design effectively reduces noise and vibration in the injection molding apparatus.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Injection molding apparatus, which comprises: an injection molding unit; a power source for said injection molding unit including at least one hydraulic pump and at least one motor driving said pump; a movable concrete mounting base with a mounting plate affixed thereto, said concrete mounting base and mounting plate mounting said power source, with mounting means in the mounting plate for mounting said power source, wherein the injection molding unit includes an injection molding unit base, and wherein said movable concrete mounting base is separate from the injection molding unit base.

2. Apparatus according to claim 1, wherein the injection molding unit is mounted on said injection molding unit base and the concrete base is movable towards and away from said injection molding unit base.

3. Apparatus according to claim 2, including a recess in the injection unit base, wherein said concrete mounting base is positioned within said recess.

4. Apparatus according to claim 1, wherein the mounting plate is a metal plate.

5. Apparatus according to claim 1, wherein said motor is an electric motor.

6. Apparatus according to claim 1, including at least one reinforcing member embedded in the concrete base.

7. Apparatus according to claim 4, wherein said reinforcing member is selected from the group consisting of (1) at least one metal bar, and (2) a metal grid.

8. Apparatus according to claim 1, including a recess in the concrete base to catch spilled fluids.

9. Apparatus according to claim 8, including a channel in the concrete base communicating with said recess and a removable plug covering said channel.

10. Apparatus according to claim 1, including a guide member affixed to said concrete base and at least one strut connecting said pump to said guide member.

11. Apparatus according to claim 1, wherein the injection molding unit is mounted on an injection molding unit base and the concrete base is movable from a position spaced from said injection molding unit base to a position enclosed by the injection molding unit base.

12. Apparatus according to claim 1, wherein the concrete base is located under the injection molding unit.

13. Method for mounting an injection molding apparatus, which comprises: providing an injection molding unit including a power source for said injection molding unit, said power source including at least one hydraulic pump and at least one motor for driving said pump; and mounting said power source on a movable concrete mounting base with a mounting plate affixed to said concrete mounting base, and with mounting means in the mounting plate for mounting said power source, including mounting the injection unit on an injection molding unit base which is separate from the movable concrete mounting base.

14. Method according to claim 13, including moving the concrete base towards and away from the injection molding unit base.

15. Method according to claim 14, including positioning the concrete mounting base within a recess in the injection unit base.

16. Method according to claim 13, including the step of affixing a metal mounting plate to the concrete mounting base.

17. Method according to claim 13, including the step of providing an electric motor as said motor.

18. Method according to claim 13, including the step of embedding at least one reinforcing member in said concrete mounting base.

19. Method according to claim 13, including the step of providing a recess in the concrete mounting base to catch spilled fluids.

20. Method according to claim 13, including mounting said pump to at least one strut connected to a guide member affixed to said concrete mounting base.

21. Method according to claim 13, including moving the concrete base from a position spaced from said injection molding unit base to a position enclosed by the injection unit base.

22. Method according to claim 13, including locating the concrete base under the injection molding unit.

* * * * *